United States Patent [19]

Pepper et al.

[11] 4,177,067
[45] Dec. 4, 1979

[54] RECOVERY OF SILVER, COPPER AND ZINC FROM PARTIALLY ROASTED PYRITE CONCENTRATE BY FERRIC SULPHATE LEACHING

[75] Inventors: Terry W. Pepper, Golden; Harry G. Bocckino, Lakewood, both of Colo.

[73] Assignee: Texasgulf Inc., Stamford, Conn.

[21] Appl. No.: 897,016

[22] Filed: Apr. 17, 1978

[51] Int. Cl.$^2$ .................. C22B 11/06; C22B 15/08; C22B 13/04
[52] U.S. Cl. ................... 75/104; 75/101 BE; 75/117; 75/118 R; 75/120; 423/24; 423/566; 423/571
[58] Field of Search .............. 75/104, 117, 118 R, 75/120, 101 BE; 423/571, 566, 24

[56] References Cited

U.S. PATENT DOCUMENTS

| | | | |
|---|---|---|---|
| 240,309 | 4/1881 | Deby | 75/104 |
| 252,593 | 1/1882 | Deby | 75/104 |
| 513,490 | 1/1894 | Emmens | 75/104 |
| 1,451,734 | 4/1923 | Irving | 75/104 |
| 1,570,777 | 1/1926 | Pike | 75/113 X |
| 2,647,827 | 4/1953 | McGauley | 75/103 |
| 2,992,894 | 7/1961 | Hazen et al. | 75/117 X |
| 3,034,864 | 5/1962 | Nashner et al. | 423/571 |
| 3,109,732 | 11/1963 | Goren | 75/101 R |
| 3,459,535 | 8/1969 | Vizsolyi et al. | 75/117 X |
| 3,476,554 | 11/1969 | Spedden et al. | 75/109 |
| 3,529,957 | 9/1970 | Kunda et al. | 75/108 |
| 3,634,071 | 1/1972 | Spedden et al. | 75/109 |
| 3,640,703 | 2/1972 | Cooper | 75/101 R |
| 3,661,563 | 5/1972 | Spedden et al. | 75/101 R |
| 3,669,651 | 6/1972 | Spedden et al. | 75/104 |
| 3,819,797 | 6/1974 | Spedden et al. | 423/27 |
| 3,966,462 | 6/1976 | Posel et al. | 75/101 BE |

Primary Examiner—G. Ozaki
Attorney, Agent, or Firm—Kenyon & Kenyon

[57] ABSTRACT

A process for treating a pyrite concentrate containing silver, copper and zinc to recover the metals contained therein is disclosed. The process includes the partial roasting of the concentrate to open the pyrite matrix to solution penetration followed by hydrometallurgical steps, including ferric sulphate leaching, reduction leaching, solid-liquid separation and metal extraction steps, to recover the copper and zinc separately and silver in concentrated form.

14 Claims, 1 Drawing Figure

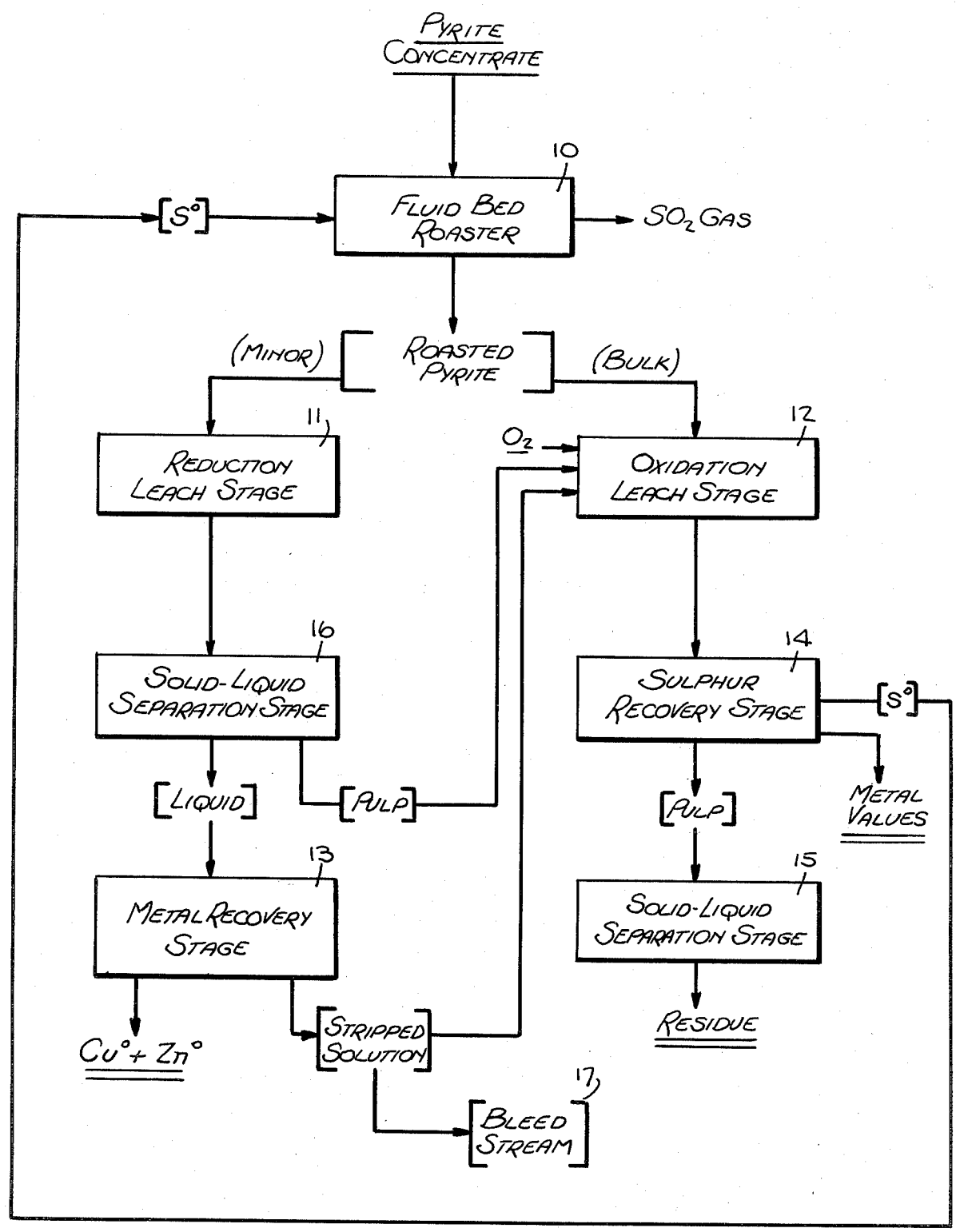

RECOVERY OF SILVER, COPPER AND ZINC FROM PARTIALLY ROASTED PYRITE CONCENTRATE BY FERRIC SULPHATE LEACHING

BACKGROUND OF THE INVENTION

1. Field of the Invention

This invention relates to a process for treating sulphur containing ores, and more particularly, is directed to a process for recovering copper, silver and zinc from a partially roasted pyrite concentrate by ferric sulphate leaching.

2. Description of the Prior Art

In the past a variety of processes have been used for the extraction of metals and non-metals from sulphide ores. In many of these processes the sulphide ores have been subjected to concentration steps prior to recovery of specific metal values contained therein. Most of these processes suffer from the same disadvantage, in that they are incapable of recovering all the metal values in the ore using one economical process.

In addition many of the prior art processes have been limited to specific ores and concentrates which have a high concentration of the desired components to make the removal of those components economically feasible.

In a number of the above mentioned processes the sulphide ore concentrates are subjected to ferric sulphate leaching techniques to recover the metal values contained therein. Some of these processes even include a thermal decomposition of the pyrite concentrate prior to leaching. However, in many of these prior art processes the pyrite concentrate matrix is virtually unattacked by the initial heating of the pyrite and therefore a significant portion of the metal values occluded in the pyrite is lost, since they cannot be reached by the leach solution.

Lastly many of the previously mentioned processes require the use of either chloride or cyanide to extract the silver from the pyrite. Chloride ions in an oxidizing atmosphere present corrosion problems and the use of cyanide may involve problems in waste control.

The process of the present invention provides for the recovery of the metal values from a pyrite ore by opening the pyrite matrix prior to the leaching stage resulting in higher percentages of metal extraction.

Furthermore the process of the present invention allows for the complete recovery of essentially all the metal values contained in the pyrite concentrate without the use of chloride or cyanide.

SUMMARY OF THE INVENTION

The present invention relates to a method for the extraction and recovery of metals and sulphur from pyrite concentrate. In accordance with the present invention the pyrite concentrate is roasted to open the pyrite matrix to solution penetration. Subsequent to roasting the pyrite is split into two fractions, the larger of which is leached in a ferric sulphate solution. When the leaching is complete, the pulp is flashed to cool the solution and to reduce the volume of the leach liquor. Wash water is then added to the oxidation leached pulp to further cool the material and to complete the solidification of the molten elemental sulphur generated during leaching.

This elemental sulphur, now in the form of pellets, is reheated and filtered. The elemental sulphur, recovered as the filtrate, is essentially pure and is recycled to the fluid bed roaster. The filter cake which contains significant amounts of the metal values is treated for metal recovery.

The oxidation leached pulp, after sulphur removal, is flocculated, and a solid-liquid separation is accomplished by settling. The settled pulp is filtered and washed and the pulp discarded.

The solution recovered from the oxidation leach stage is then reduced by contacting it with a small amount of roasted pyrite concentrate in a reduction leach stage.

After the reduction stage is completed the pulp is flocculated and filtered. The filter cake or pulp is then returned to the oxidation leach stage to recover any metal contained therein while the solution, is treated to recover copper and zinc.

The copper is recovered from solution by precipitation with either iron or zinc while the zinc is recovered by solvent extraction and electrowinning.

Accordingly, it is an object of the process of the present invention to recover copper, silver, zinc, and lead from pyrite concentrate.

Another object of the process of the present invention is the recovery of silver from pyrite concentrate without the use of cyanide, which presents health hazards.

Another object of the process of the present invention is the production of a concentrated $SO_2$ gas stream for sulphuric acid production.

Another object of the process of the present invention is the recovery of silver without the use of chloride which presents corrosion problems.

Still other objects and advantages of the present invention will be apparent from the specification and attached drawing.

BRIEF DESCRIPTION OF THE DRAWING

For a fuller understanding of the invention reference is had to the following description taken in connection with the accompanying drawing wherein a flow chart of the preferred embodiment, indicating the various stages or steps in schematic form, is shown.

DESCRIPTION OF THE PREFERRED EMBODIMENT

The process of the present invention comprises treating a pyrite concentrate containing silver, copper, and zinc to recover the metals. The process involves roasting the concentrate followed by hydrometallurgical steps to recover copper and zinc separately and silver in a concentrated form.

As shown by the flow chart depicted in the drawing the process comprises seven basic steps or stages, those being: a pyrite roasting stage, an oxidation leach stage, a sulphur recovery stage, a first solid-liquid separation stage, a reduction leach stage, a second solid-liquid separation stage and a metal recovery stage.

For the purpose of clarity the process of the present invention will be described in reference to the above listed steps.

Pyrite Roasting Stage

Referring to the drawing the pyrite concentrate is introduced to fluid bed roaster 10 wherein a portion of the sulphur originally contained in the concentrate is driven off.

In order to completely open the pyrite matrix to leach solution penetration it has been calculated that at least 50% of the pyrite sulphur should be removed, however, it had been found in practice that somewhat less than 50% sulphur elimination is sufficient to allow satisfactory solution penetration to the occluded minerals. In cases where the roasting stage is also being used to evaporate water added for washing purposes, more than 50% sulphur elimination may be required to maintain the reaction temperature.

During the roasting stage exhaust gas will be generated. This gas contains very little oxygen and consists primarily of nitrogen, water vapor, sulphur dioxide, and traces of sulphur trioxide. This gas, after removal of entrained particles, may be used in the production of sulphuric acid.

It has been found that sulphur elimination of about 45% to 80% not only produces a strong $SO_2$ off-gas suitable for sulphuric acid production, but also opens the pyrite matrix sufficiently to allow rapid and essentially complete dissolution of the copper and zinc occluded therein by the leach solution. Sulphur elimination of 45% to 50% is preferred to leave maximal sulphur for elemental sulfur formation during leaching.

In addition to the above, the hot gases generated during roasting may be used in waste heat boilers to generate steam. However, when using waste heat boilers, about 80% sulphur elimination is preferred in order to produce maximal steam without forming ferrites in the roasted pyrite. Roasting temperatures of about 550° C. to about 700° C. are suitable to prevent ferrite formation when sulphur elimination of from about 45% to about 80% is effected.

Oxidation Leach Stage

Subsequent to roasting, the pyrite concentrate is split into two fractions the larger of which is introduced to the oxidation leach stage 12 where it undergoes oxidation in a ferric sulphate solution.

As can be seen in the drawing, two solution streams enter the oxidation leach stage. The first of these solutions is the stripped solution from the metal recovery stage 13 which acts as a lixiviant for the oxidation leaching reaction. The second solution stream introduces the pulp from the reduction leach stage and contains a small amount of reduced pregnant solution. All of the iron contained in these solutions is originally present as ferrous ion and is oxidized to ferric ion in the reaction described by the following equation:

$$2Fe^{+2} + 1/2O_2 + 2H^+ \rightarrow 2Fe^{+3} + H_2O$$

More specifically this reaction may be described for the ferric sulphate system of the present invention by the following equation:

$$2FeSO_4 + 1/2O_2 + H_2SO_4 \rightarrow Fe_2(SO_4)_3 + H_2O$$

The ferric ions formed as shown above, leach the copper, zinc, and iron minerals from the pyrite as shown below:

$$CuFeS_2 + 2Fe_2(SO_4)_3 \rightarrow CuSO_4 + 5FeSO_4 + 2S°$$

$$ZnS + Fe_2(SO_4)_3 \rightarrow ZnSO_4 + 2FeSO_4 + S°$$

$$FeS + Fe_2(SO_4)_3 \rightarrow 3FeSO_4 + S°$$

Lead and silver are relatively unleached by the ferric sulphate solution.

As can be seen from the above equation the oxidation leach stage not only effects the dissolution of copper and zinc but also results in the generation of elemental sulphur. It has been found that silver in the form of silver sulphide is collected in this elemental sulphur and that higher leaching temperatures generally result in higher silver concentrates in the sulphur.

In addition to its effect on the concentration of the metals entrapped by the elemental sulphur, the leaching temperature also has an effect on the amount of the sulphur present in the leached pulp.

At temperatures greater than about 150° C. the elemental sulphur begins oxidizing at a significant rate to form sulphuric acid and as the temperature exceeds 175° C. the amount of recoverable elemental sulphur declines rapidly. At 200° C., no elemental sulphur is recovered. It has been found that a temperature range of between about 175° C. and 185° C. gives maximum silver loading of the sulphur without major loss of sulphur recovery.

In the temperature range of about 175° C. to about 185° C., the optimal oxygen partial pressure is over 120 psia, preferably 150 psia, supplied as oxygen or air. At these temperatures 20 minutes is adequate for reaction and any additional time results in reduced sulphur recovery and correspondingly reduced silver recovery. Pulp densities of up to 400 grams of roasted pyrite per 600 ml of leaching solution react satisfactorily, while pulp densities of under 100 grams of roasted pyrite per 600 ml of leaching solution result in an unsatisfactorily weak pregnant solution.

The concentration of the constituents within the oxidation leach solution will depend upon the material being leached, the reaction rate desired, as well as the limits imposed by the nature of the containment vessels. Generally it has been found when using a Kidd Creek pyrite concentrate, that the oxidation leaching stage solution will have the following composition:

| Constituent | Concentration |
|---|---|
| Fe(T) | 5– 30 g/l |
| $SO_4^{-2}$ | 40–100 g/l |

The pH of this solution may vary from about 0.6 to about 1.0, however, in order to prevent acid build-up small amounts of NaOH may be added.

Sulphur Recovery Stage

At the conclusion of the oxidation leaching stage the solution is flashed to 100° C. and introduced to the sulphur recovery stage 14. Water, used for washing the final residue and then the sulphur pellets, is added to the pulp to provide further cooling. The sulphur pellets which form at the time of cooling are next recovered by either screening or flotation. The pellets are washed on a screen with water previously used to wash the oxidation leach residue. The pellets are then heated to about 150° C., such that the viscosity of the molten sulphur is at a minimum, and filtered. Essentially pure sulphur is collected as a filtrate for recycle to the fluid bed Roaster. The filter cake containing silver and some copper and zinc is recovered for extraction of the metals contained therein. In an alternate embodiment the sulphur is recovered by dissolution in an organic solvent.

First Solid-Liquid Stage

The oxidation leach pulp, after the sulphur pellets have been removed, is subjected to a first solid-liquid separation stage 15 where it is flocculated and settled. The thickened pulp, which contains about 50% solids, is then filtered and washed. The washed residue, containing about 28% moisture, is discarded.

Reduction Leach Stage

The clear lixiviant which results from the solid-liquid separation stage is high in ferric ion. This high concentration of ferric ion concentration would result in excess reductant consumption if metal recovery were attempted. Therefore, in order to reduce the concentration of ferric ions in the solution, it is contacted with fresh roasted pyrite in the reduction leach stage 11 (not shown). The ferric ions are reduced to ferrous ions by reaction with artificial pyrrhotite contained in the partially roasted pyrite by the following equation:

$$Fe_2(SO_4)_3 + FeS \rightarrow 3FeSO_4 + S°$$

The temperature of the reduction leaching stage may vary considerably, from ambient (22° C.) to the melting point of sulphur. However, over 119° C., the elemental sulphur tends to coat the particles and inhibit reactions. At 100° C., 90% ferric ion reduction can be achieved in 30 minutes with the addition of an excess of about 60% roasted pyrite concentrate. Note that for optimum results during the reduction leaching stage, oxygen partial pressure in the reaction vessel should be minimized.

Second Solid-Liquid Separation Stage

When the reduction leaching stage has been completed the reduced product is recovered and introduced to a second solid-liquid separation stage 16 where it is flocculated and then filtered. The filter cake is then recycled to the oxidation leaching stage for recovery of the residual copper and zinc, as well as the silver and sulphur, while the clear filtrate is processed to recover the copper and zinc. In an alternate embodiment the reduction leach pulp is flocculated and settled. The settled pulp is then recycled to the oxidation leaching stage.

Metal Recovery Stage

Copper may be recovered from the clear filtrate by precipitation while the zinc is recovered by solvent extraction and electrowinning. Precipitation may be carried out with a variety of metals, iron being the most common in commercial operations. Zinc may also be used if available.

As can be seen from the drawing, the stripped solution from metal recovery stage 13 is recycled to the oxidation leach stage 12. A bleed stream 17 isolates a portion of the stripped solution to compensate for water added to the system during washing operations.

In another embodiment of the present invention the sulphur pellets recovered from the sulphur recovery stage are subjected to an additional leach stage in which the pellets are leached at approximately 135° C. to dissolve copper and zinc without major oxidation of the elemental sulphur.

Although the solution concentrations in the present invention may vary, estimated solution concentrations are given in the following table. The values for copper and zinc are based on a 30% solids leach and therefore these values would be higher if the pulp densities were increased. On the other hand the iron and sulphate analysis would be expected to remain the same if no changes were made in the pH or temperature.

| Solution | FERRIC SULPHATE PROCESS LEACHING SOLUTION CONCENTRATIONS | | | |
|---|---|---|---|---|
| | $Cu^{+2}$ (g/l) | $Zn^{+2}$ (g/l) | $Fe^{+2}$ (g/l) | $SO_4^{-2}$ (g/l) |
| Stripped Solution | 0.00 | 0.1 | 19 | 76 |
| Reduced Pregnant Solution | 0.20 | 9.7 | 19 | 76 |
| Pregnant Solution | 0.24 | 11.4 | 15[1] | 90 |
| Diluted Pregnant Solution | 0.20 | 9.7 | 13[1] | 76 |

[1]Ferric ion ($Fe^{+3}$)

The foregoing process may be illustrated by the following example.

EXAMPLE

Pyrite concentrate containing silver, copper, lead and zinc was roasted in a fluid bed roaster at 595° C. until approximately 44% of the sulphur contained therein was eliminated. The roasted pyrite was then subjected to a ferric sulphate leach stage. The temperature within the leach stage was 175° C. at an oxygen partial pressure of 150 psia. The pulp density within the leach stage was 30%. After 20 minutes of leaching the solution was flashed to 100° C. and the elemental sulphur generated during leaching was separated.

The following are the amounts of metals recovered from the solution and the sulphur based on the amount contained in the roasted pyrite:

| Product Phase | PERCENT METAL EXTRACTED (by weight) | | | | |
|---|---|---|---|---|---|
| | Ag | Cu | Pb | Zn | Fe |
| Solution | 0 | 12 | 0 | 46 | 5 |
| Sulphur | 90 | 84 | 24 | 49 | 13 |
| Total | 90 | 96 | 24 | 95 | 18 |

The sulphur generated during the leach stage was then heated to 150° C. and filtered. The amount of sulphur recovered from the filtrate was 92.1% which was recycled to the roaster. The filter cake containing silver and some copper and zinc was then treated to recover the metal values. Listed below are the concentrations of metals recovered.

| Metal Recovered From Filter Cake | Material Concentration (by weight) |
|---|---|
| Ag | 18.1 OZ/T |
| Cu | 3.22% |
| Pb | 0.15% |
| Zn | 19.2% |
| Fe | 13.9% |
| S(T) | 45.7% |
| S° | 29.7% |

The clear lixiviant which results from the solid-liquid separation of the oxidation leach solution is then contacted with a small amount of roasted pyrite in a reduction leach stage at a temperature of 100° C. for 30 minutes. The roasted pyrite addition is 1.71 g/g $Fe^{+3}$ and the oxygen partial pressure within the reduction vessel is zero. It is found that 90% $Fe^{+3}$ reduction was affected.

Metal extraction from the roasted pyrite is shown below:

| Metal Extracted | Percent Metal Extracted (by weight) |
| --- | --- |
| Cu | 0 |
| Zn | 54 |
| Fe | 52 |

The reduced pulp is then flocculated and filtered. The filtrate is processed to recover the dissolved metal valves by precipitation of copper and solvent extraction of zinc.

It will be apparent to workers skilled in this art that the foregoing process, while described with respect to certain preferred and exemplary materials and conditions, is subject to numerous other variations and alternations easily ascertainable from the description contained herein without departing from the scope and spirit of the invention as defined by the appended claims.

What is claimed is:

1. A process for the recovery of silver, copper and zinc from a pyrite concentrate, comprising the steps of:
    (a) partially roasting the pyrite concentrate to open the pyrite matrix to solution penetration by driving off a portion of the sulphur contained therein;
    (b) leaching under oxidizing conditions the bulk of the roasted pyrite concentrate to extract the silver, copper and zinc from therein;
    (c) cooling the oxidation leached pulp and recovering the elemental sulphur generated during the leaching;
    (d) heating the elemental sulphur pellets to recover silver and the portion of the copper and zinc contained therein;
    (e) subjecting the solution resulting from the oxidation leach, containing the copper and zinc metals to a reduction leach stage wherein ferric ions contained therein are reduced to ferrous ions; and
    (f) introducing the reduced solution from said reduction stage to a metal recovery stage wherein the copper and zinc are recovered therefrom.

2. The process of claim 1 wherein said pyrite concentrate is roasted until about 45% to about 80% of the sulphur contained therein is driven off.

3. The process of claim 2 wherein the pyrite concentrate is roasted at a temperature of from about 550° C. to about 700° C.

4. The process of claim 1 wherein the pyrite concentrate is leached using a ferric sulphate solution at a temperature of from about 150° C. to about 200° C.

5. The process of claim 4 wherein the temperature within the leach stage is from 175° C. to 185° C.

6. The process of claim 5 wherein the oxygen partial pressure within the oxidation leaching stage is about 150 psia.

7. The process of claim 5 wherein the pulp density within the oxidation leaching stage is from about 100 grams to about 400 grams of roasted pyrite per 600 ml of leaching solution.

8. The process of claim 4 wherein the oxygen partial pressure within the oxidation leach stage is over 120 psia.

9. The process of claim 1 wherein the reduction stage comprises contacting the oxidation leach solution with a small amount of freshly roasted pyrite concentrate at a temperature of from about 22° C. to about 119° C. at an oxygen partial pressure of zero.

10. The process of claim 9 which further comprises flocculating and filtering the product from the reduction stage in a solid-liquid separation stage to produce a filter cake and filtrate, said filter cake being recycled to said oxidation leach stage to recover any residual copper, zinc, silver or sulphur contained therein and said filtrate being processed to recover the metal values therein.

11. The process of claim 10 wherein the stripped solution from the metal recovery stage is recycled to said oxidation leaching stage.

12. A process for the recovery of silver, copper and zinc from a pyrite concentrate, comprising the steps of:
    (a) partially roasting the pyrite concentrate at a temperature of from about 550° C. to about 700° C. until about 45% to 50% of the sulphur contained therein is driven off;
    (b) introducing the majority of the partially roasted pyrite to an oxidation leach stage to extract the silver, copper and zinc values contained therein, said leaching being accomplished using a ferric sulphate solution at a temperature of about 175° C. to about 185° C. and the oxygen partial pressure within said leaching stage being about 150psia;
    (c) cooling the oxidation leached pulp by flashing and recovering the elemental sulphur pellets generated during the oxidation stage;
    (d) heating the elemental sulphur pellets to about 150° C., and thereafter filtering said sulphur and recovering silver and the portion of the copper and zinc in sulphur as a filter cake, and recycling the elemental sulphur filtrate to the roasting stage for SO$_2$ production;
    (e) subjecting the oxidation leached solution, containing the copper and zinc to a reduction leach stage, said reduction leach stage comprising contacting the oxidation leached solution with a small amount of freshly roasted pyrite concentrate at a temperature of from about 22° C. to about 119° C. and maintaining the oxygen partial pressure within said reduction stage at zero;
    (f) introducing the reduced solution from said reduction stage to a solid-liquid separation stage wherein said solution is flocculated and filtered to produce a filter cake and filtrate;
    (g) processing the filtrate from said solid-liquid separation stage to recover copper and zinc and;
    (h) recycling said filter cake from said solid-liquid separation stage to the oxidation leach stage to recover any residual copper and zinc contained therein.

13. The process of claim 12 wherein the copper contained in the filtrate produced by the solid-liquid separation stage is recovered by precipitation.

14. The process of claim 12 wherein the zinc contained in the filtrate produced by the solid-liquid separation stage is recovered by solvent extraction and electrowinning.

* * * * *

UNITED STATES PATENT AND TRADEMARK OFFICE
CERTIFICATE OF CORRECTION

PATENT NO. : 4,177,067
DATED : December 4, 1979
INVENTOR(S) : Terry W. Pepper and Harry G. Bocckino It is certified that error appears in the above–identified patent and that said Letters Patent are hereby corrected as shown below:

Col. 3,
Lines 48, 53, 59, 61 and 63 "1/2" should be " $\longrightarrow$ ".

Signed and Sealed this

First Day of April 1980

[SEAL]

Attest:

SIDNEY A. DIAMOND

Attesting Officer

Commissioner of Patents and Trademarks